(Model.)
C. J. & G. F. DANIELSON.
Brake for Sewing Machines.
No. 235,752. Patented Dec. 21, 1880.
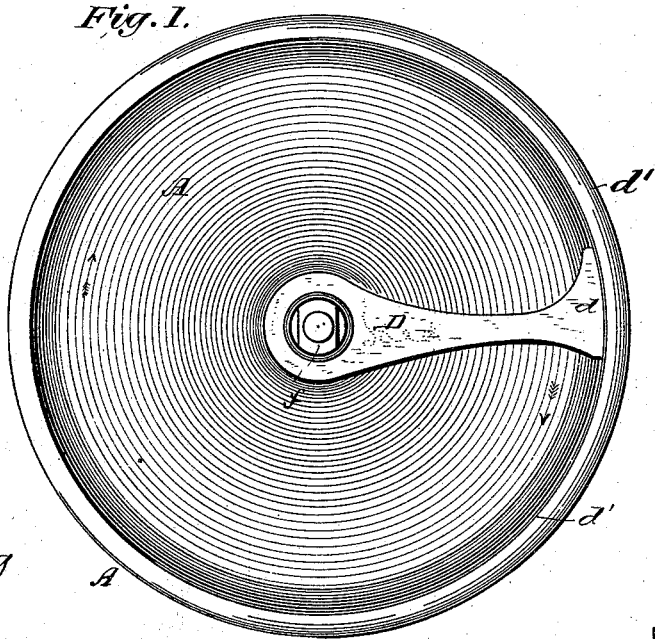
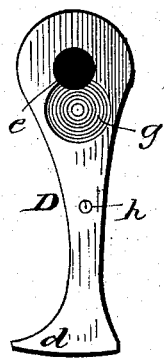
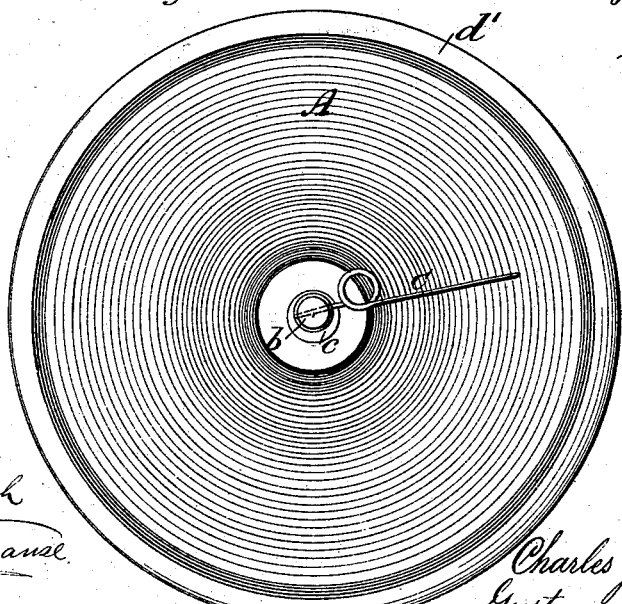
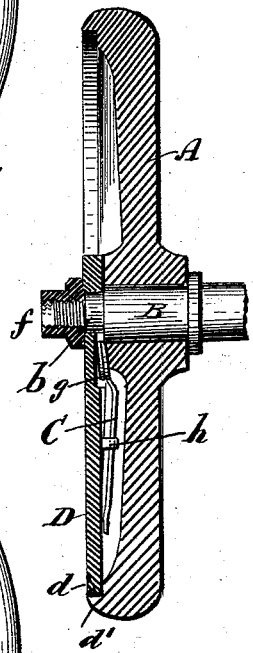
Witnesses
Fred G. Dieterich
Albert H. Krause
Inventors:
Charles J. Danielson
Gustave F. Danielson
by Louis Bagger & Co.
Attorneys
N. PETERS, PHOTO-LITHOGRAPHER, WASHINGTON, D. C.

United States Patent Office.

CHARLES J. DANIELSON AND GUSTAVE F. DANIELSON, OF HYDE PARK, ILL.

BRAKE FOR SEWING-MACHINES.

SPECIFICATION forming part of Letters Patent No. 235,752, dated December 21, 1880.

Application filed September 6, 1880. (Model.)

*To all whom it may concern:*

Be it known that we, CHARLES J. DANIELSON and GUSTAVE F. DANIELSON, of Hyde Park, in the county of Cook and State of Illinois, have invented certain new and useful Improvements in Brakes for Sewing-Machines; and we do hereby declare that the following is a full, clear, and exact description of the invention, which will enable others skilled in the art to which it appertains to make and use the same, reference being had to the accompanying drawings, which form a part of this specification, and in which—

Figure 1 is a face view of the fly or drive wheel of a sewing-machine fitted with our improved brake. Fig. 2 is an inverted view of the brake. Fig. 3 is a face view of the wheel with the brake removed, and Fig. 4 is a diametrical section through the wheel with its brake.

Similar letters of reference indicate corresponding parts in all the figures.

Our invention has relation to devices for arresting the rotations of the shaft of a sewing-machine during the operation of "spooling" or winding the bobbin, or for preventing the shaft from rotating in the wrong direction; and it consists in the combination, with the shaft and its drive-wheel, of a peculiarly-constructed brake mechanism, substantially as hereinafter more fully set forth.

In the drawings, A is the drive-wheel, which is hung loosely upon the drive-shaft B, passing through its center.

Projecting from the free outer end of shaft B is a tap or stud, $b$. This, however, does not project from the center of the shaft, but is set to one side thereof, as clearly shown in Fig. 3 of the drawings, so that the shaft will, in respect of its projecting stud $b$, form an eccentric, $c$. The inner end of stud $b$, close up against shaft B, is perforated for the insertion of a spring, C, made of steel wire, which said spring will therefore revolve with the shaft when the machine is in operation.

The brake consists of an arm, D, terminating in a curved shoe, $d$, and provided with an eye or aperture, $e$, at its inner end, by which it may be inserted upon the eccentric stud $b$, upon which it is held in place by the nut $f$. The inner side of arm D, facing the wheel, has a circular recess or depression, $g$, to accommodate the coil of spring C, and also a notched pin, $h$, against which the free end of the spring bears when the brake is properly in position upon the wheel.

If the wheel or pulley A revolves to the right, in the direction of the arrows, it will, by its first turn upon shaft B, lock or bind the brake-shoe $d$ against its flanged periphery $d'$, on account of the eccentric position of arm D upon the shaft, thus causing shaft B to revolve with the wheel, the spring C serving to hold the brake in its proper position; but if the wheel is reversed the brake-shoe $d$ will be no longer in frictional contact with the wheel-flange $d'$, and the wheel will revolve loosely upon the shaft, which, with its spring C and arm D, will remain stationary.

It will be observed that this brake mechanism is very simple and inexpensive in its construction and is applicable to all kinds of sewing-machines. It requires no "setting" or other manipulation to operate it, but works automatically and with absolute certainty, thus preventing breaking of thread and other annoyances if by accident the machine is started the wrong way.

Having thus described our invention, we claim and desire to secure by Letters Patent of the United States—

1. The brake-arm D, chambered at $g$, and provided with the eye $e$, pin $h$, and curved shoe $d$, as set forth.

2. The combination, with the drive-shaft B, having perforated tap $b$ and eccentric $c$, of the brake-arm D, chambered at $g$, and provided with the eye $e$, pin $h$, and curved shoe $d$, as specified.

In testimony that we claim the foregoing as our own we have hereto affixed our signatures in presence of two witnesses.

CHARLES J. DANIELSON.
GUSTAVE F. DANIELSON.

Witnesses:
LEVI SPRAGUE,
THOMAS JAMES REDMOND.